(12) United States Patent
Sun et al.

(10) Patent No.: US 10,601,565 B2
(45) Date of Patent: Mar. 24, 2020

(54) FLEXIBLE DATA AND/OR REFERENCE SIGNAL SCHEDULING IN ONE OR MORE UPLINK PILOT TIME SLOTS IN A WIRELESS NETWORK

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/692,436

(22) Filed: Aug. 31, 2017

(65) Prior Publication Data
US 2018/0083745 A1    Mar. 22, 2018

Related U.S. Application Data

(60) Provisional application No. 62/398,012, filed on Sep. 22, 2016.

(51) Int. Cl.
*H04L 5/00* (2006.01)
*H04W 88/00* (2009.01)

(52) U.S. Cl.
CPC ............ *H04L 5/005* (2013.01); *H04L 5/0044* (2013.01); *H04L 5/0048* (2013.01);
(Continued)

(58) Field of Classification Search
CPC ... H04W 88/02; H04W 88/04; H04W 88/005; H04L 5/001; H04L 5/0055; H04L 5/005; H04L 5/0057
See application file for complete search history.

(56) References Cited

U.S. PATENT DOCUMENTS

2015/0078222 A1    3/2015  Yang et al.
2015/0195070 A1*   7/2015  Kim ...................... H04L 1/0027
                                                                370/329
(Continued)

OTHER PUBLICATIONS

CMCC: "Discussion on PUSCH transmission for UpPTS", 3GPP TSG RAN WG1 Meeting #85, R1-164884, May 13, 2016, XP051096840, Retrieved from the Internet: URL:http://www.3gpp.org/ftp/tsg_ran/WG1_RL1/TSGR1_85/Docs/, 3 pages.
(Continued)

*Primary Examiner* — Diane D Mizrahi
(74) *Attorney, Agent, or Firm* — Patterson & Sheridan, LLP

(57) ABSTRACT

Certain aspects of the present disclosure provide techniques for flexible scheduling of reference signals and data in an uplink pilot time slot (UpPTS) in a wireless network. A method of wireless communication by a base station (BS) is provided. The method generally includes scheduling a first one or more symbols of a UpPTS for one or more user equipments (UEs) to transmit data and a second one more symbols of the UpPTS for one or more UEs to transmit one or more sounding reference signals (SRSs). The BS receives the data in the first one or more symbols and the one or more SRSs in the second one or more symbols. Based on the scheduling received from the BS, the UE determines the symbols of the UpPTS for transmission of SRSs and data.

26 Claims, 14 Drawing Sheets

(52) U.S. Cl.
CPC .......... *H04L 5/0051* (2013.01); *H04L 5/0083* (2013.01); *H04W 88/005* (2013.01)

(56) References Cited

U.S. PATENT DOCUMENTS

| | | | |
|---|---|---|---|
| 2015/0365218 A1 | 12/2015 | Yang et al. | |
| 2016/0197671 A1* | 7/2016 | Hwang | H04B 7/2615 370/330 |
| 2016/0373229 A1* | 12/2016 | You | H04L 5/0057 |
| 2018/0083745 A1* | 3/2018 | Sun | H04L 5/005 |
| 2018/0098358 A1* | 4/2018 | Rico Alvarino | H04L 5/001 |
| 2018/0123744 A1* | 5/2018 | Nogami | H04W 52/146 |
| 2018/0145818 A1* | 5/2018 | Choi | H04L 5/0007 |
| 2018/0205534 A1* | 7/2018 | Yi | H04L 5/1469 |

OTHER PUBLICATIONS

Partial International Search Report—PCT/US2017/050050—ISA/EPO—dated Dec. 4, 2017.
QUALCOMM Incorporated: "PUSCH in UpPTS", 3GPP Draft; R1-166294, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 21, 2016, XP051140147, Retrieved from the Internet: URL:http://www.3gpp.org/ftp/Meetings_3GPP_SYNC/RAN1/Docs/ [retrieved on Aug. 21, 2016], 8 pages.
International Search Report and Written Opinion—PCT/US2017/050050—ISA/EPO—dated Jun. 6, 2018.

\* cited by examiner

… (1)

FLEXIBLE DATA AND/OR REFERENCE SIGNAL SCHEDULING IN ONE OR MORE UPLINK PILOT TIME SLOTS IN A WIRELESS NETWORK

CROSS-REFERENCE TO RELATED APPLICATION & PRIORITY CLAIM

This application claims benefit of and priority to U.S. Provisional Patent Application Ser. No. 62/398,012, filed Sep. 22, 2016, which is herein incorporated by reference in its entirety for all applicable purposes.

BACKGROUND

Field of the Disclosure

Aspects of the present disclosure relate generally to wireless communications systems, and more particularly, to flexibly scheduling data and/or one or more reference signals in an uplink pilot time slot (UpPTS) in a wireless network.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of base stations (BS) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, an enhanced/evolved NB (eNB), a next generation Node B (gNB), access point (AP), radio head, transmission reception point (TRP), new radio (NR) BS, 5G NB, etc.).

These multiple access technologies have been adopted in various telecommunication standards to provide a common protocol that enables different wireless devices to communicate on a municipal, national, regional, and even global level. An example of an emerging telecommunication standard is NR, for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. As the demand for mobile broadband access continues to increase, there exists a need for further improvements in LTE and NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In long term evolution (LTE) Release-13, the time division duplexing (TDD) subframe configurations define special subframe that include a 6-symbol uplink pilot time slot (UpPTS). User equipment (UE) transmit a sounding reference signal (SRS) in certain symbols of the UpPTS. In LTE Release-14, UEs can also transmit data (e.g., physical uplink shared channel (PUSCH)) in the 6-symbol UpPTS to increase throughput. Aspects of the present disclosure provide techniques and apparatus for flexibly scheduling symbols in UpPTSs for data and/or SRS transmission. For example, the base station (BS) can balance scheduling more symbols in the UpPTS for data to increase throughout with scheduling more symbols in the UpPTS for SRS for better channel estimation for more UEs.

Certain aspects of the present disclosure provide a method for wireless communication that may be performed, for example, by a BS. The method generally includes scheduling a first one or more symbols of a UpPTS for one or more UEs to transmit data and a second one or more symbols of the UpPTS for one or more UEs to transmit one or more SRSs. The BS receives the data in the first one or more symbols and the one or more SRSs in the second one or more symbols.

Certain aspects of the present disclosure provide an apparatus for wireless communication, such as a BS. The apparatus generally includes means for scheduling a first one or more symbols of a UpPTS for one or more UEs to transmit data and a second one or more symbols of the UpPTS for one or more UEs to transmit one or more SRSs. The apparatus includes means for receiving the data in the first one or more symbols and the one or more SRSs in the second one or more symbols.

Certain aspects of the present disclosure provide an apparatus for wireless communication, such as a BS. The apparatus generally includes at least one processor coupled with a memory and configured to schedule a first one or more symbols of a UpPTS for one or more UEs to transmit data and a second one or more symbols of the UpPTS for one or more UEs to transmit one or more SRSs. The apparatus includes a receiver configured to receive the data in the first one or more symbols and the one or more SRSs in the second one or more symbols.

Certain aspects of the present disclosure provide a computer readable medium having computer executable code stored thereon for wireless communication that may be performed, for example, by a BS. The code generally includes code for scheduling a first one or more symbols of a UpPTS for one or more UEs to transmit data and a second one or more symbols of the UpPTS for one or more UEs to transmit one or more SRSs. The code includes code for receiving the data in the first one or more symbols and the one or more SRSs in the second one or more symbols.

Certain aspects of the present disclosure provide a method for wireless communication that may be performed, for example, by a UE. The method generally includes determining a first one or more symbols of a UpPTS for transmission of data and a second one or more symbols of the UpPTS for transmission of one or more SRSs. The determining is based on scheduling received from a BS. The UE transmits the data in the first one or more symbols of the UpPTS and the one or more SRSs in the second one or more symbols of the UpPTS.

Certain aspects of the present disclosure provide an apparatus for wireless communication, such as a UE. The apparatus generally includes means for determining a first one or more symbols of a UpPTS for transmission of data and a second one or more symbols of the UpPTS for transmission of one or more SRSs. The determining is based on scheduling received from a BS. The determining is based on scheduling received from a BS. The apparatus includes means for transmitting the data in the first one or more symbols of the UpPTS and the one or more SRSs in the second one or more symbols of the UpPTS.

Certain aspects of the present disclosure provide an apparatus for wireless communication, such as a UE. The apparatus generally includes at least one processor coupled with a memory and configured to determine a first one or more symbols of a UpPTS for transmission of data and a second one or more symbols of the UpPTS for transmission of one or more SRSs. The determining is based on scheduling received from a BS. The at least one processor determines based on scheduling received from a BS. The apparatus includes a transmitter configured to transmit the data in the first one or more symbols of the UpPTS and the one or more SRSs in the second one or more symbols of the UpPTS.

Certain aspects of the present disclosure provide a computer readable medium having computer executable code stored thereon for wireless communication that may be performed, for example, by a UE. The code generally includes code for determining a first one or more symbols of a UpPTS for transmission of data and a second one or more symbols of the UpPTS for transmission of one or more SRSs. The determining is based on scheduling received from a BS. The determining is based on scheduling received from a BS. The code includes code for transmitting the data in the first one or more symbols of the UpPTS and the one or more SRSs in the second one or more symbols of the UpPTS Aspects generally include methods, apparatus, systems, computer program products, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
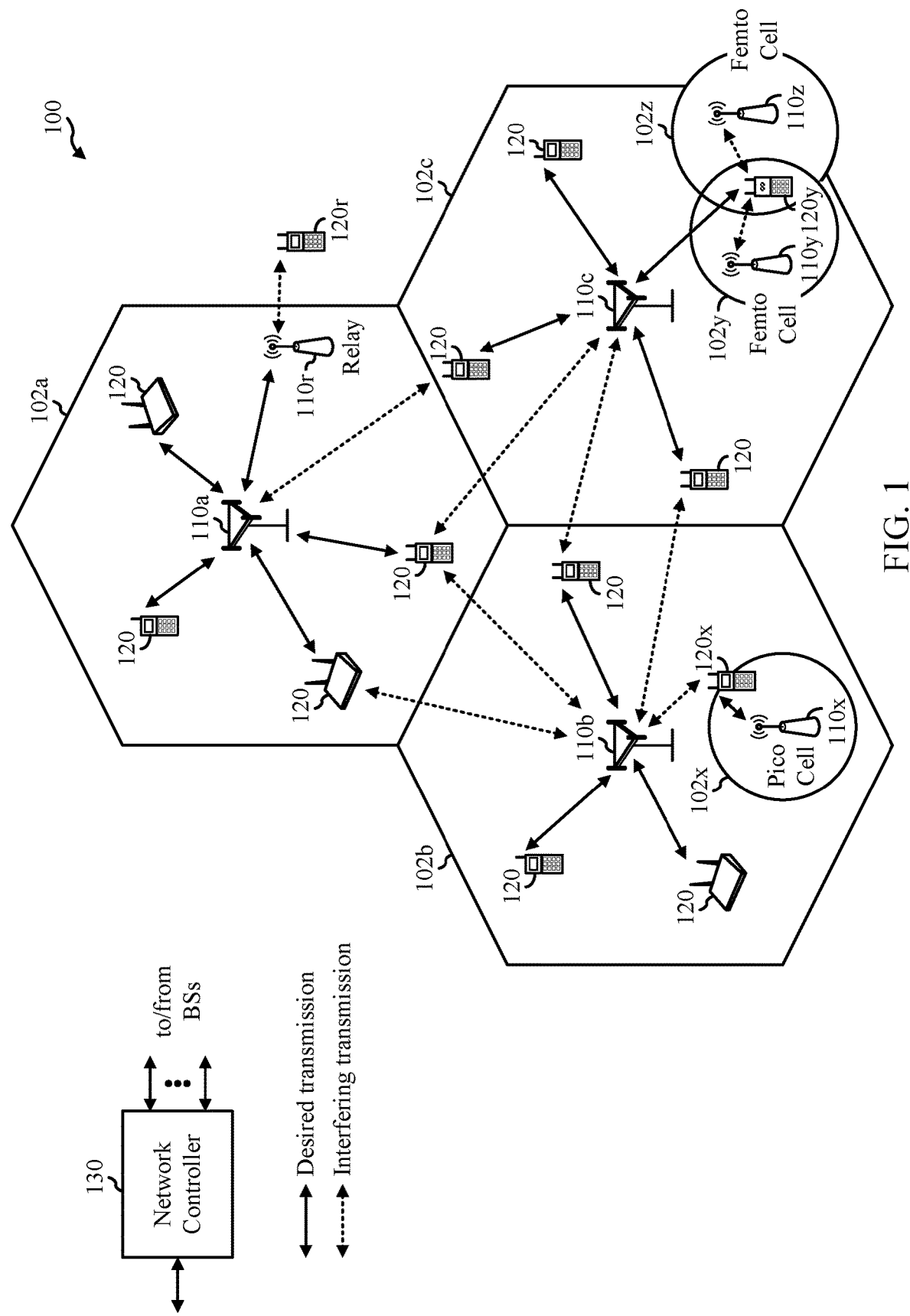
FIG. 1 is a block diagram conceptually illustrating an example wireless communication system, in accordance with certain aspects of the present disclosure.

In certain systems, such as long term evolution (LTE), a subframe format may include an uplink pilot time slot (UpPTS). For example, in LTE Release-13 a six symbol UpPTS is provided for certain subframes (e.g., special subframes). In Release 13, a user equipment (UE) may be scheduled to transmit a sounding reference signal (SRS) in certain symbols of the UpPTS. In certain systems, such as LTE Release-14, a UE may be scheduled to transmit data (e.g., physical uplink shared channel (PUSCH)) in the UpPTS, for example, to increase throughput.

Aspects of the present disclosure provide techniques and apparatus for flexibly scheduling symbols in one or more UpPTSs for data and/or reference signal transmission.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication system 100 in which aspects of the present disclosure may be performed. For example, the wireless network may be a new radio or 5G network. Base station (BS) 110 may be an enhanced/evolved (eNB), a next generation NB (gNB), a transmission reception point (TRP), NB, 5G NB, access point (AP), new radio (NR) BS, etc.). The BS 110 may flexibly schedule one or more user equipments (UEs) 120 to transmit reference signals, such as sounding reference signals (SRS) and/or demodulation reference signals (DMRS), and data (e.g., a physical uplink shared channel (PUSCH)) in one or more symbols of the uplink pilot time slot (UpPTS) in a radio frame.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless communication system 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication system 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless communication system 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication system 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplexing (TDD). A single component carrier bandwidth of 100 MHZ may be supported. NR RBs may span 12 subcarriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
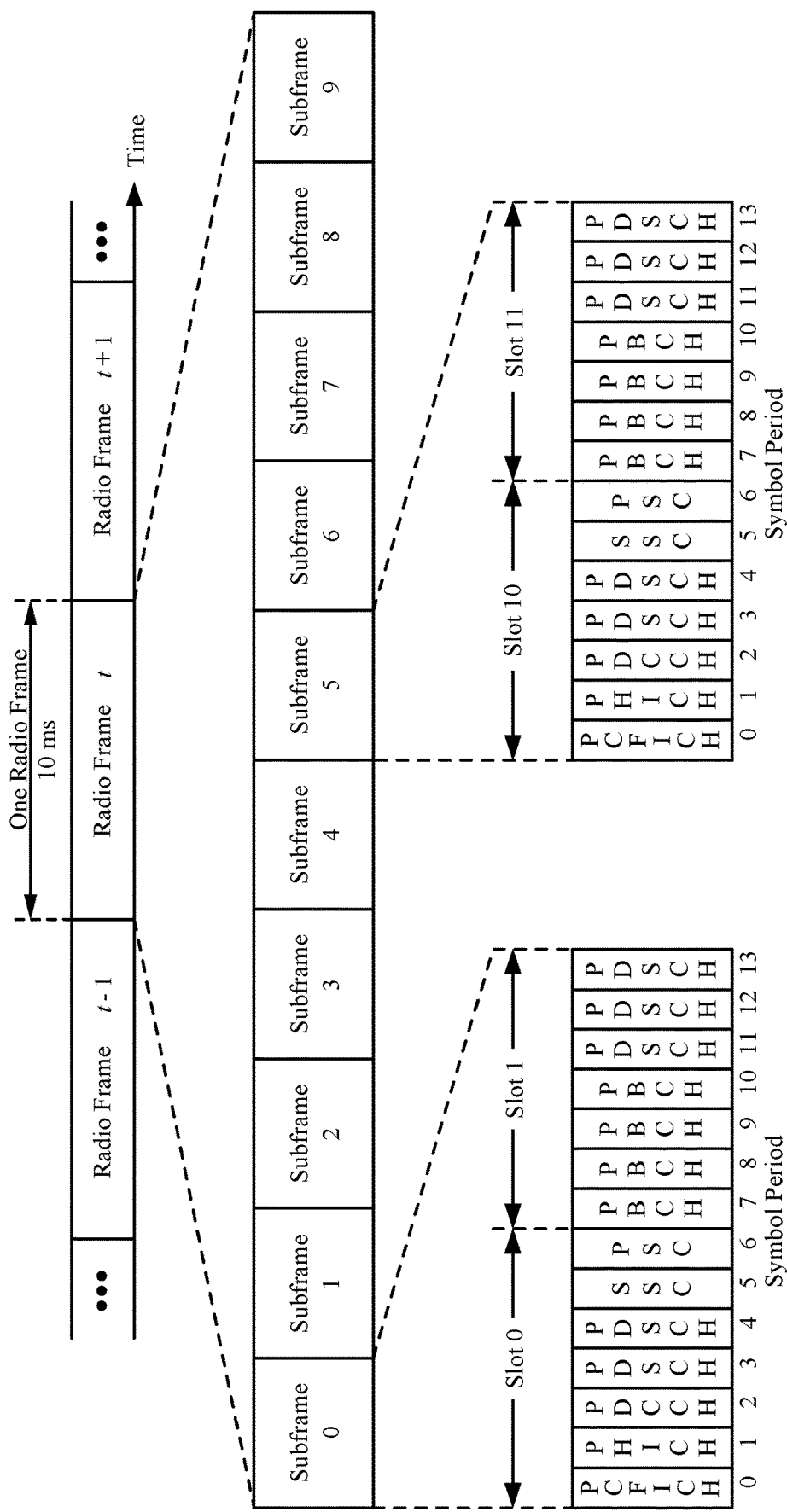
FIG. 2 is a block diagram conceptually illustrating an example downlink frame structure in a wireless communication system, in accordance with certain aspects of the present disclosure.

FIG. 2 shows a downlink (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended CP. The 2L symbol periods in each subframe may be assigned indices of 0 through 2L−1. The available time frequency resources may be partitioned into RBs. Each RB may cover N subcarriers (e.g., 12 subcarriers) in one slot.

In certain systems (e.g., LTE), a BS may send a primary synchronization signal (PSS) and a secondary synchronization signal (SSS) for each cell in the BS. The PSS and SSS may be sent in symbol periods 6 and 5, respectively, in each of subframes 0 and 5 of each radio frame with the normal CP, as shown in FIG. 2. The synchronization signals may be used by UEs for cell detection and acquisition. The BS may send a Physical Broadcast Channel (PBCH) in symbol periods 0 to 3 in slot 1 of sub-frame 0. The PBCH may carry certain system information.

The BS may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, for example, with less than 10 RBs. In the example shown in FIG. 2, M=3. The BS may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The BS may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The BS may send the PSS, SSS and PBCH in the center 1.08 MHz of the system bandwidth used by the Node B. The BS may send the PCFICH and PHICH across the entire system bandwidth in each symbol period in which these channels are sent. The BS may send the PDCCH to groups of UEs in certain portions of the system bandwidth. The BS may send the PDSCH to specific UEs in specific portions of the system bandwidth. The BS may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements (REs) may be available in each symbol period. Each RE may cover one subcarrier in one symbol period and may be used to send one modulation symbol, which may be a real or complex value. REs not used for a reference signal in each symbol period may be arranged into resource element groups (REGs). Each REG may include four REs in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, for example, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A BS may send the PDCCH to the UE in any of the combinations that the UE will search.

A UE may be within the coverage of multiple BSs. One of these BSs may be selected to serve the UE. The serving BS may be selected based on various criteria such as received power, path loss, signal-to-noise ratio (SNR), etc.

In certain systems (e.g., such as NR or 5G systems), a BS may transmit these or other signals in these locations or in different locations of the subframe. As described in more detail below, certain aspects of the present disclosure provide for flexible scheduling of SRS, data, and/or DMRS in symbols of the UpPTS of special subframes.

Figure 3:
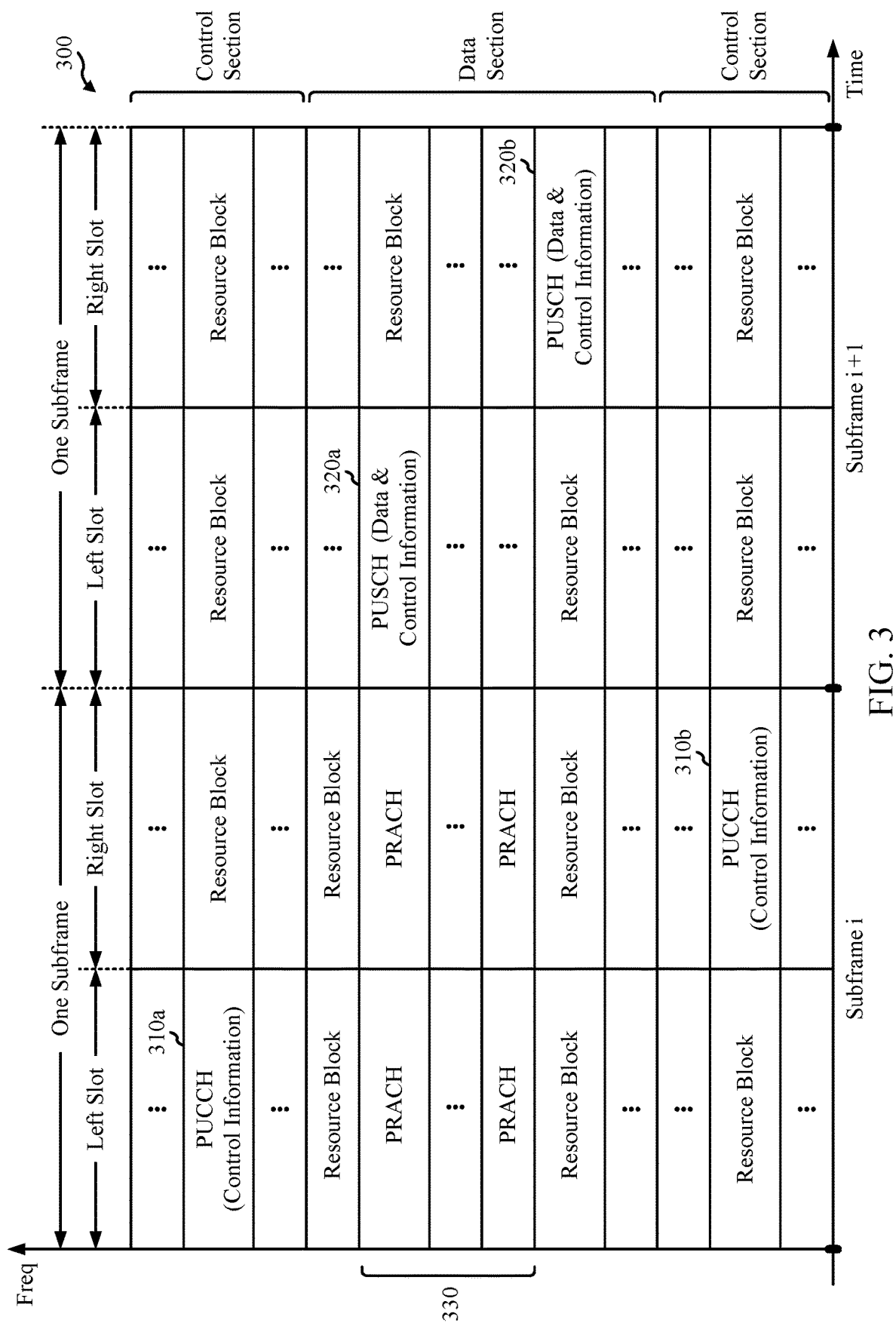
FIG. 3 is a diagram illustrating an example uplink frame structure in a wireless communication system, in accordance with certain aspects of the present disclosure.

FIG. 3 is a diagram 300 illustrating an example of an uplink (UL) frame structure in a wireless telecommunications system (e.g., LTE). The available RBs for the UL may be partitioned into a data section and a control section. The control section may be formed at the two edges of the system bandwidth and may have a configurable size. The RBs in the control section may be assigned to UEs for transmission of control information. The data section may include all RBs not included in the control section. The UL frame structure results in the data section including contiguous subcarriers, which may allow a single UE to be assigned all of the contiguous subcarriers in the data section.

A UE may be assigned RBs 310a, 310b in the control section to transmit control information to a BS. The UE may also be assigned RBs 320a, 320b in the data section to transmit data to the BS. The UE may transmit control information in a physical UL control channel (PUCCH) on the assigned RBs in the control section. The UE may transmit only data or both data and control information in a physical UL shared channel (PUSCH) on the assigned RBs in the data section. A UL transmission may span both slots of a subframe and may hop across frequency.

A set of RBs may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive RBs. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

In certain systems (e.g., such as NR or 5G systems), a BS may transmit these or other signals in these locations or in different locations of the subframe.

Figure 4:
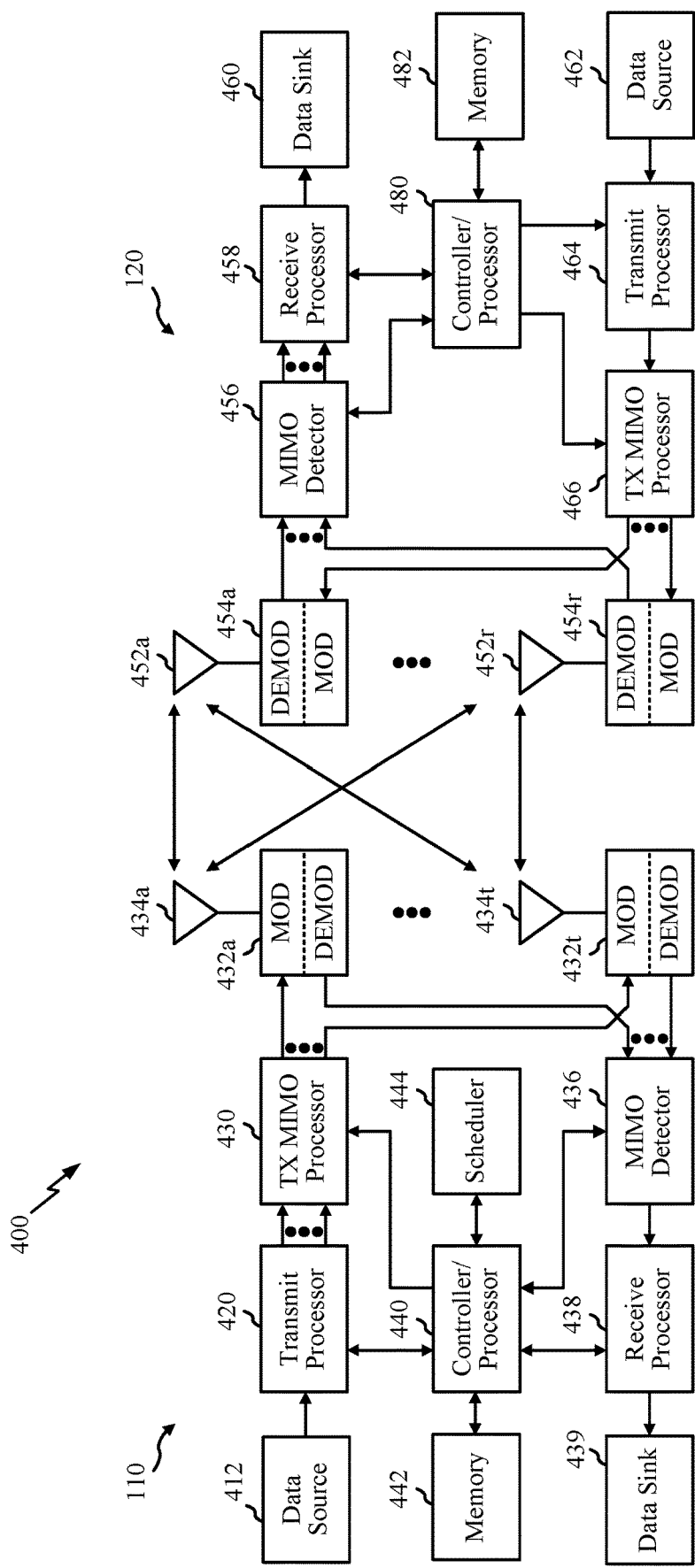
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 may be used to perform the operations described herein and illustrated with reference to FIG. 13 and/or antennas 434, processors 440, 420, 438, and/or controller/processor 440 of the BS 110 may be used to perform the operations described herein and illustrated with reference to FIG. 12.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a base station of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct, for example, the execution of various processes for the techniques described herein. The processor 480 and/or other processors and modules at the UE 120 may also perform or direct, for example, the execution of the functional blocks illustrated in FIG. 13, and/or other processes for the techniques described herein. The memories 442 and 482 may store data and program codes for the BS 110 and the UE 120, respectively. A scheduler 444 may schedule one or more UEs for data and/or control transmissions on the downlink and/or uplink.

Figure 5:
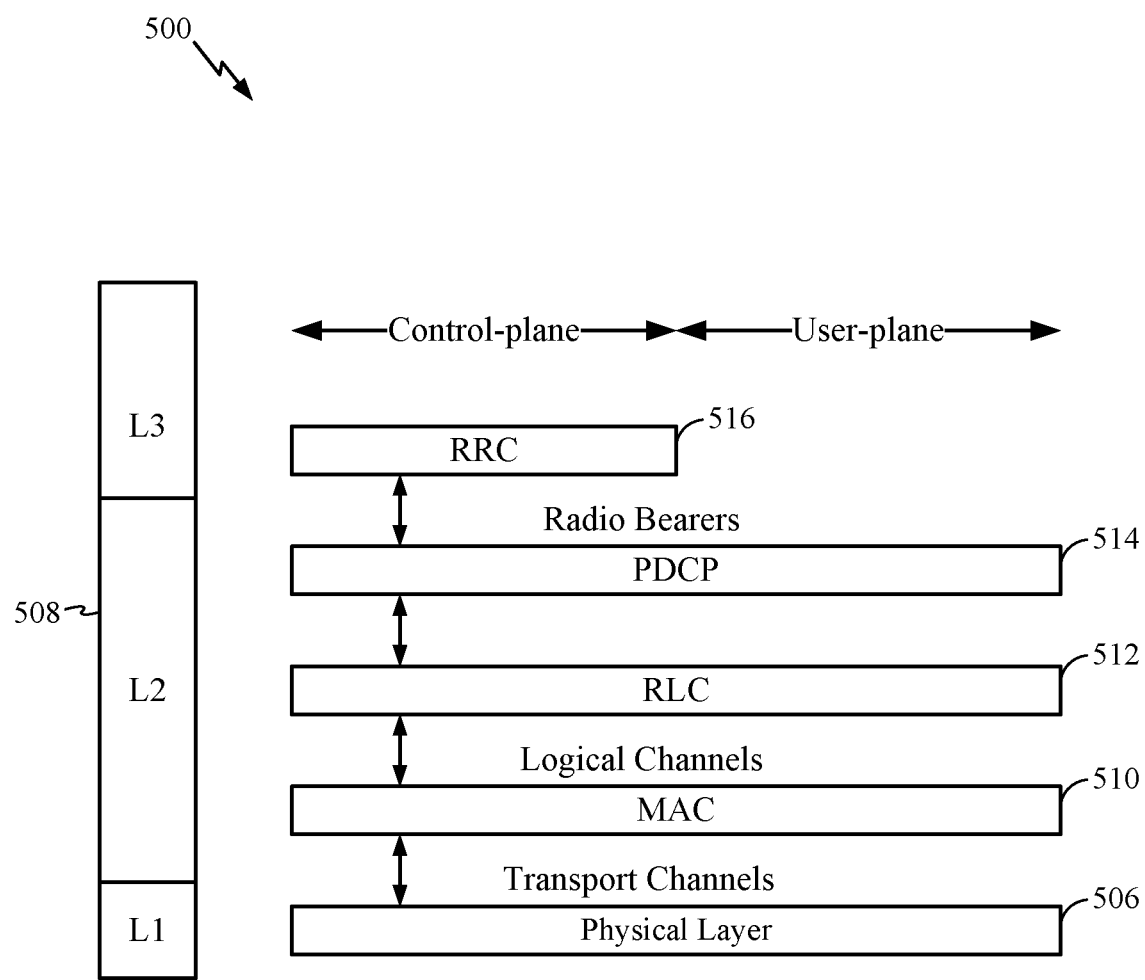
FIG. 5 is a diagram illustrating an example radio protocol architecture for the user and control planes, in accordance with certain aspects of the present disclosure.

FIG. 5 is a diagram 500 illustrating an example of a radio protocol architecture for the user and control planes in certain systems (e.g., LTE). The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes, for example, a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

Figure 6:
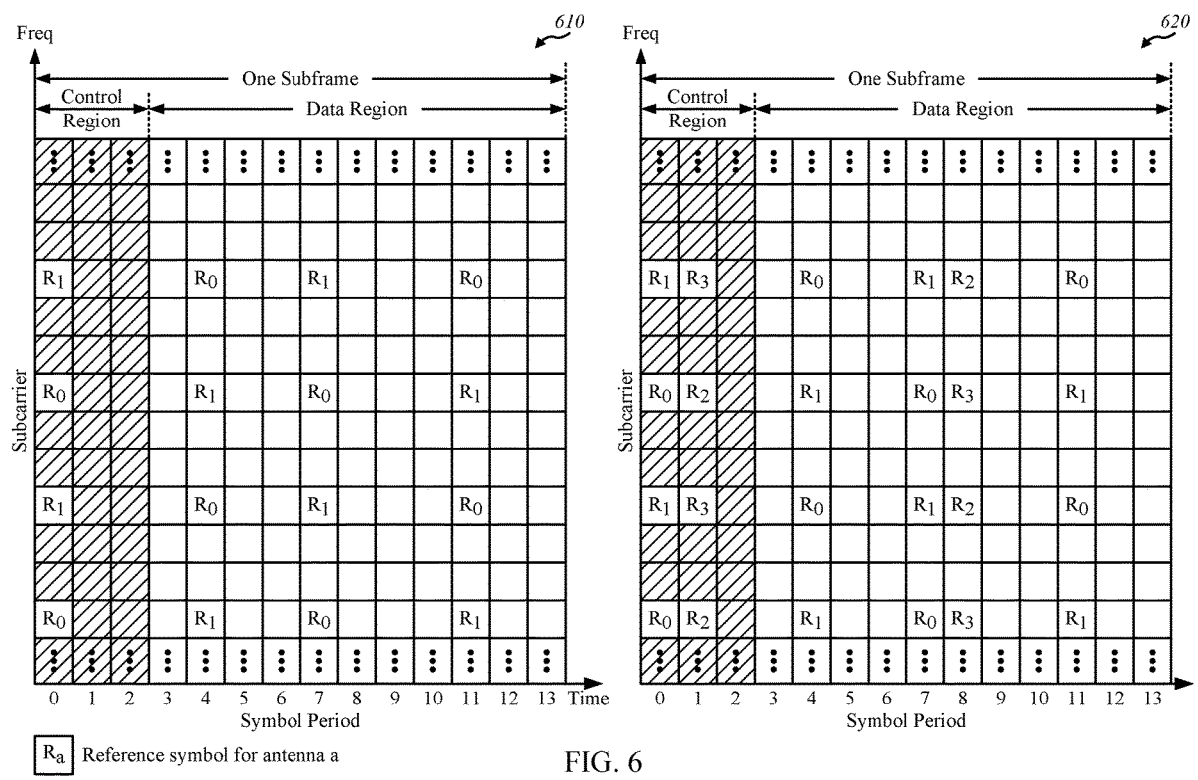
FIG. 6 illustrates an example subframe resource element mapping, in accordance with certain aspects of the present disclosure.

FIG. 6 shows two exemplary subframe formats 610 and 620 for the downlink with the normal CP. The available time frequency resources for the downlink may be partitioned into RBs. Each RB may cover 12 subcarriers in one slot and may include a number of REs. Each RE may cover one subcarrier in one symbol period and may be used to send one modulation symbol, which may be a real or complex value.

Subframe format 610 may be used for a BS equipped with two antennas. A common reference signal (CRS) may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, for example, generated based on a cell identity (ID). In FIG. 6, for a given RE with label Ra, a modulation symbol may be transmitted on that RE from antenna a, and no modulation symbols may be transmitted on that RE from other antennas. Subframe format 620 may be used for a BS equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different BSs may transmit their CRSs on the same or different subcarriers, depending on their cell IDs. For both subframe formats 610 and 620, REs not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for frequency division duplexing (FDD) (e.g., in LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support HARQ for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, for example, all transmissions of the packet may be sent in subframes of a single interlace. For asynchronous HARQ, for example, each transmission of the packet may be sent in any subframe.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHz may be supported. NR RBs may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
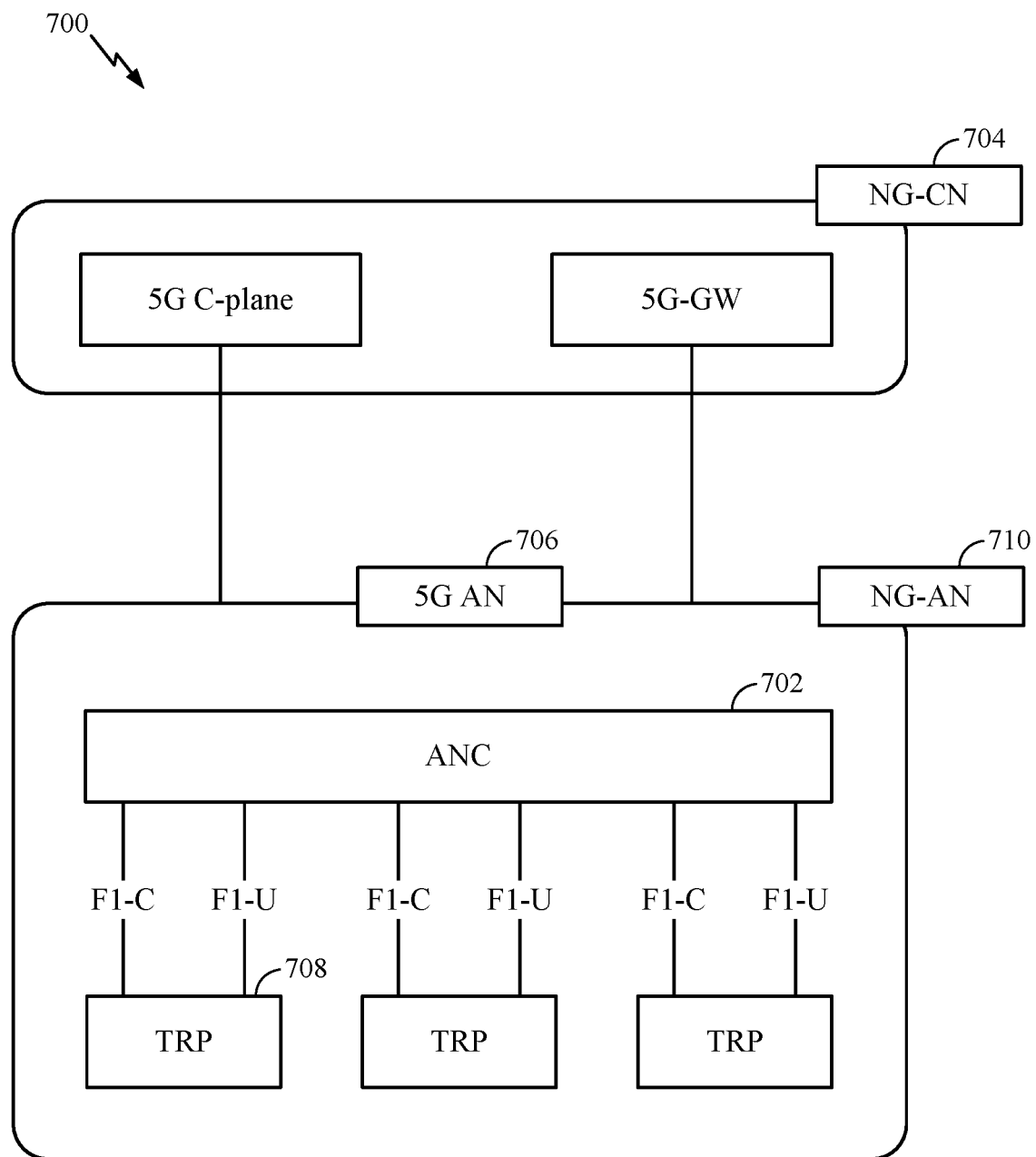
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC 702 may be a central unit (CU) of the distributed RAN 700. The backhaul interface to the next generation core network (NG-CN) 704 may terminate at the ANC 702. The backhaul interface to neighboring next generation access nodes (NG-ANs) 710 may terminate at the ANC 702. The ANC 702 may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP 708 may be connected to more than one ANC. A TRP may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 710 may support dual connectivity with NR. The NG-AN 710 may share a common fronthaul for LTE and NR. The logical architecture may enable cooperation between and among TRPs 708. For example, cooperation may be preset within a TRP and/or across TRPs via the ANC 702. No inter-TRP interface may be present. The logical architecture may support a dynamic configuration of split logical function. The PDCP, RLC, and/or MAC protocols may be adaptably placed at the ANC 702 or TRP 708.

A BS may include a central unit (CU) (e.g., ANC 702) and/or one or more distributed units (e.g., one or more TRPs 708).

Figure 8:
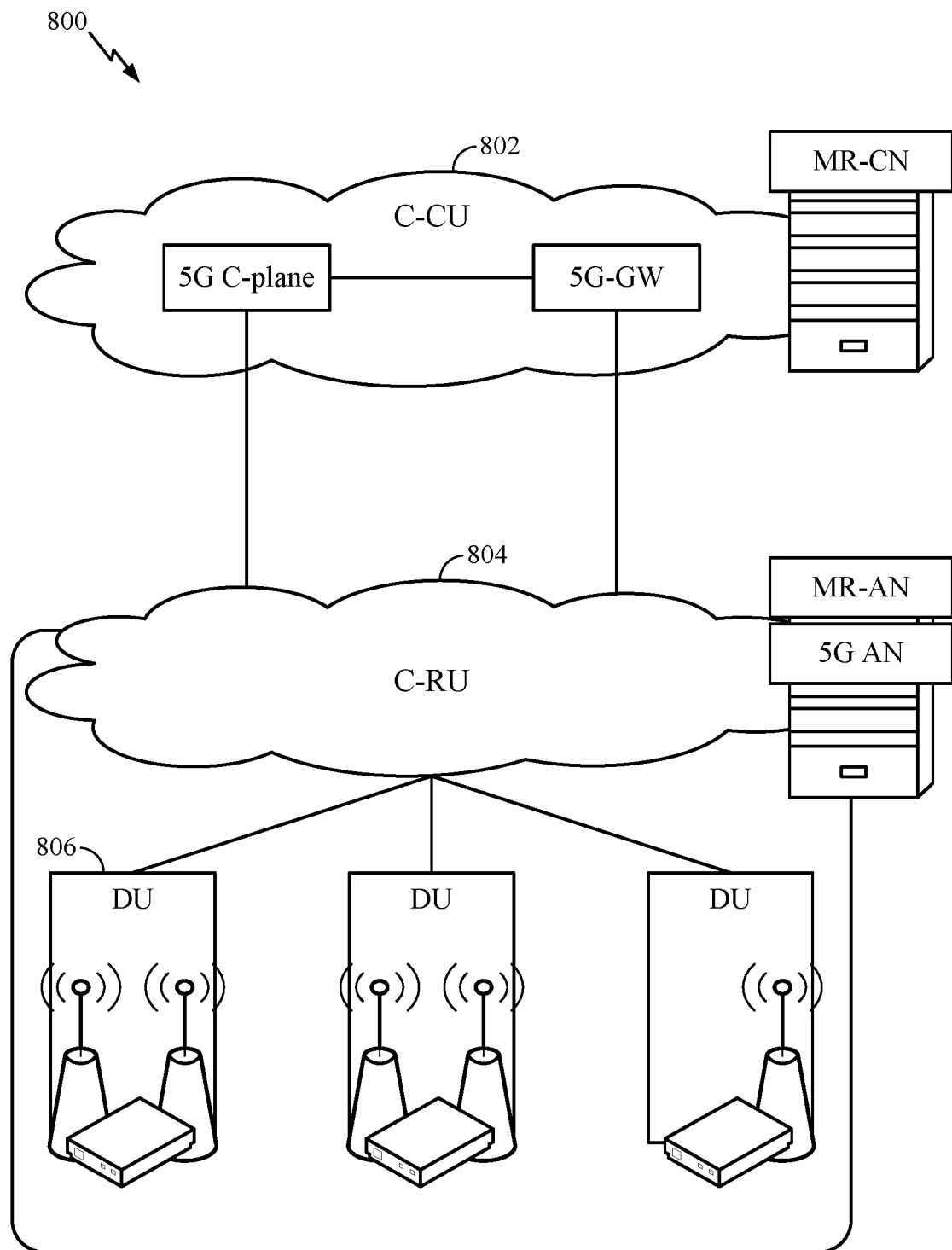
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU 802 may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU 804 may host core network functions locally. The C-RU 804 may have distributed deployment. The C-RU 804 may be close to the network edge.

A DU 706 may host one or more TRPs. The DU may be located at edges of the network with radio frequency (RF) functionality.

Figure 9:
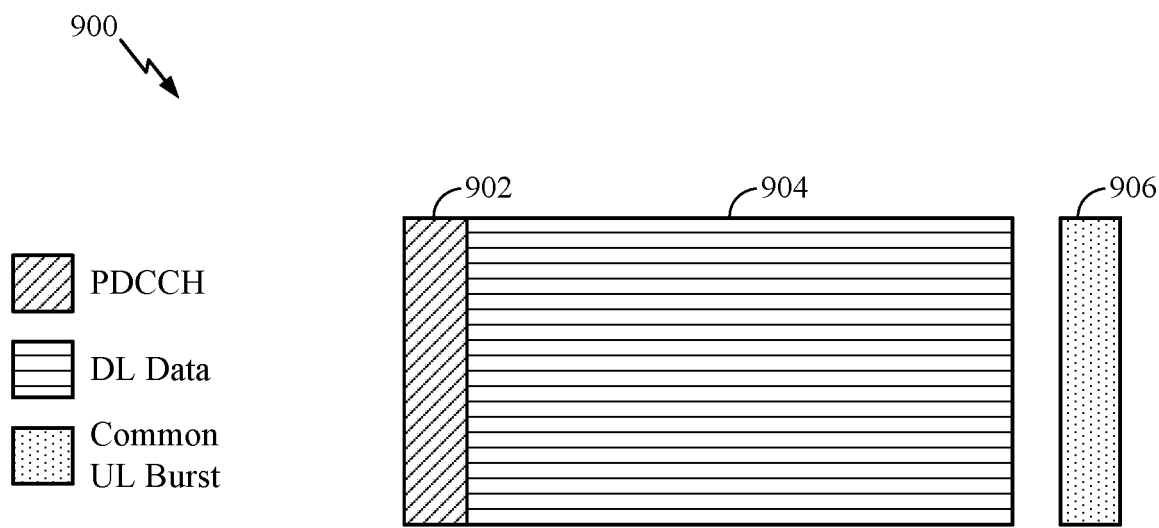
FIG. 9 is a diagram illustrating an example of a downlink (DL)-centric subframe, in accordance with certain aspects of the present disclosure.

FIG. 9 is a diagram showing an example of a DL-centric subframe 900 (e.g., also referred to as a downlink centric "slot"). The DL-centric subframe 900 may include a control portion 902. The control portion 902 may exist in the initial or beginning portion of the DL-centric subframe 900. The control portion 902 may include various scheduling information and/or control information corresponding to various portions of the DL-centric subframe 900. The control portion 902 may be a physical DL control channel (PDCCH), as shown in FIG. 9. The DL-centric subframe 900 may also include a DL data portion 904. The DL data portion 904 may be referred to as the payload of the DL-centric subframe 900. The DL data portion 904 may include the communication resources utilized to communicate DL data from the scheduling entity (e.g., UE or BS) to the subordinate entity (e.g., UE). The DL data portion 904 may be a physical DL shared channel (PDSCH).

The DL-centric subframe 900 may also include a common UL portion 906. The common UL portion 906 may be referred to as an UL burst, a common UL burst, and/or various other suitable terms. The common UL portion 906 may include feedback information corresponding to various other portions of the DL-centric subframe 900. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to RACH procedures, scheduling requests (SRs), and various other suitable types of information. As illustrated in FIG. 4A, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe 900 and alternative structures having similar features may exist without necessarily deviating from the aspects described herein.

Figure 10:
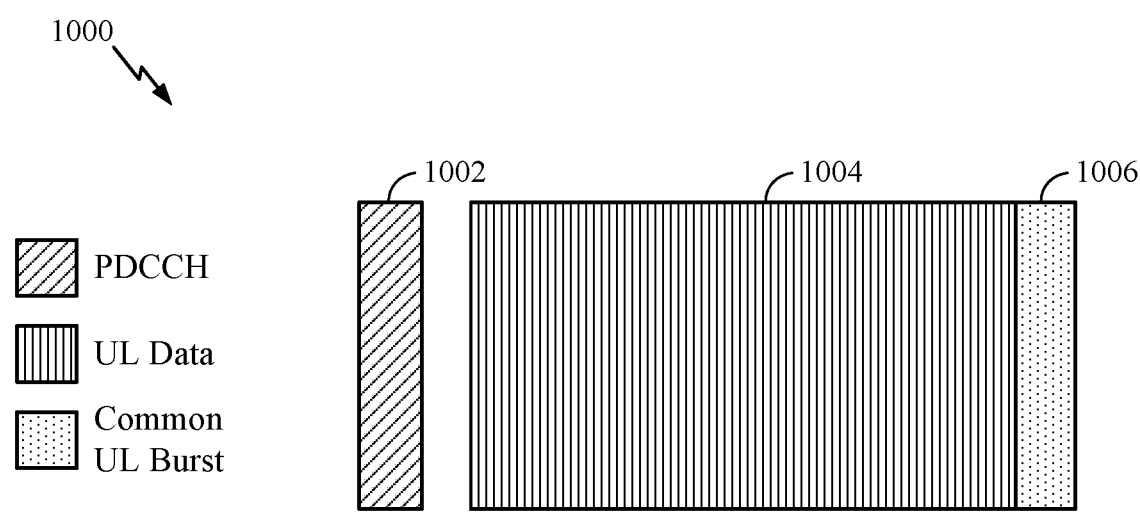
FIG. 10 is a diagram illustrating an example of an uplink (UL)-centric subframe, in accordance with certain aspects of the present disclosure.

FIG. 10 is a diagram showing an example of an UL-centric subframe 1000. The UL-centric subframe 1000 may include a control portion 1002. The control portion 1002 may exist in the initial or beginning portion of the UL-centric subframe 1000. The control portion 1002 in FIG. 10 may be similar to the control portion 902 described above with reference to FIG. 9. The UL-centric subframe 1000 may also include an UL data portion 1004. The UL data portion 1004 may be referred to as the payload of the UL-centric subframe 1000. The UL portion may refer to the communication resources utilized to communicate UL data from the subordinate entity (e.g., UE) to the scheduling entity (e.g., UE or BS). The control portion 1002 may be a physical downlink control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 1000 may also include a common UL portion 1006. The common UL portion 1006 in FIG. 10 may be similar to the common UL portion 906 described above with reference to FIG. 9. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum)

Figure 11:
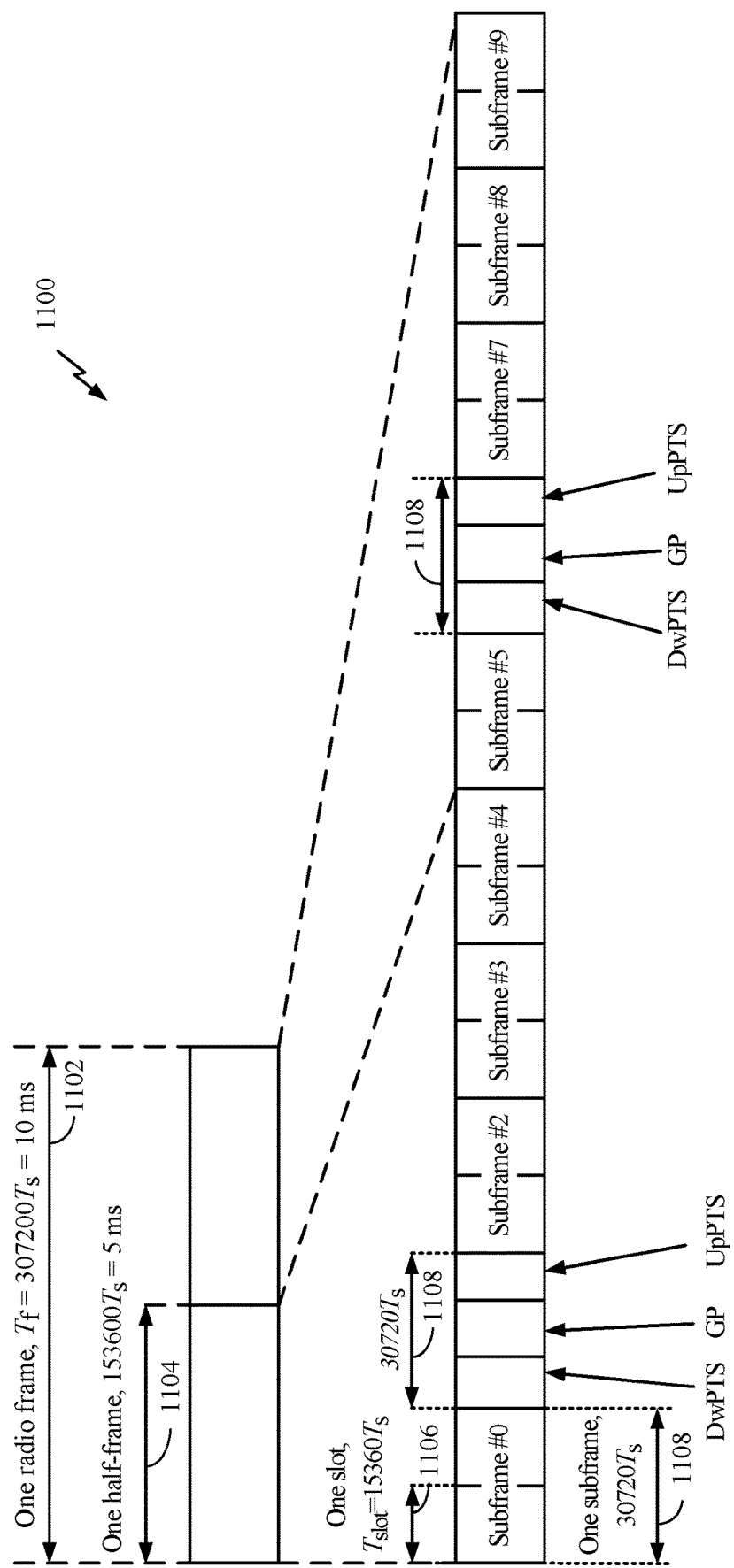
FIG. 11 illustrates an example subframe frame format including an uplink pilot time slot (UpPTS), in accordance with certain aspects of the present disclosure.

Example Flexible Data and/or Reference Signal Scheduling in One or More Uplink Pilot Time Slots in a Wireless Network In certain systems, such as long term evolution (LTE), a subframe format may include an uplink pilot time slot (UpPTS). FIG. 11 shows an example frame structure 1100 having a UpPTS. In the example shown in FIG. 11, a 10 ms radio frame 1102 includes two half frames 1104 of equal length (e.g., 5 ms). Each half frame 1104 includes 10 slots (not shown) or 8 slots 1106 plus a special subframe 1108 including three special fields referred to as the DwPTS (downlink pilot time slot), the GP (guard period), and the UpPTS. Each slot 1106 is 0.5 ms in length and two consecutive slots form exactly one subframe 810. The special subframes 1108 can be used for switching between uplink and downlink subframes, for example, in time division duplexing (TDD) operation.

In LTE Release-13 a six-symbol (e.g., 6 orthogonal frequency division multiplexed (OFDM) symbols) UpPTS is provided for certain subframes (e.g., special subframes). In Release 13, a user equipment (UE) (e.g., such as UE 120) may be scheduled (e.g., by a BS 110) to transmit a sounding reference signal (SRS) in certain symbols of the UpPTS. In certain systems, such as LTE Release-14, a UE may be scheduled to transmit data (e.g., physical uplink shared channel (PUSCH)) in the UpPTS, for example, to increase throughput. The BS can use the SRS to measure and estimate the channel, for example, for uplink scheduling and/or adapt to channel variation. More frequent SRS may improve the channel estimation. In aspects, if the TDD uplink downlink configuration has more downlink subframes than uplink subframes it may desirable to have additional SRS to support more uplink UEs.

Aspects of the present disclosure provide techniques and apparatus for flexibly scheduling symbols in a UpPTS for data (e.g., PUSCH) and/or one or more reference signals (e.g., SRSs) transmission in a wireless network (e.g., a Rel-14 LTE network, new radio (NR), or 5G network).

Figure 12:
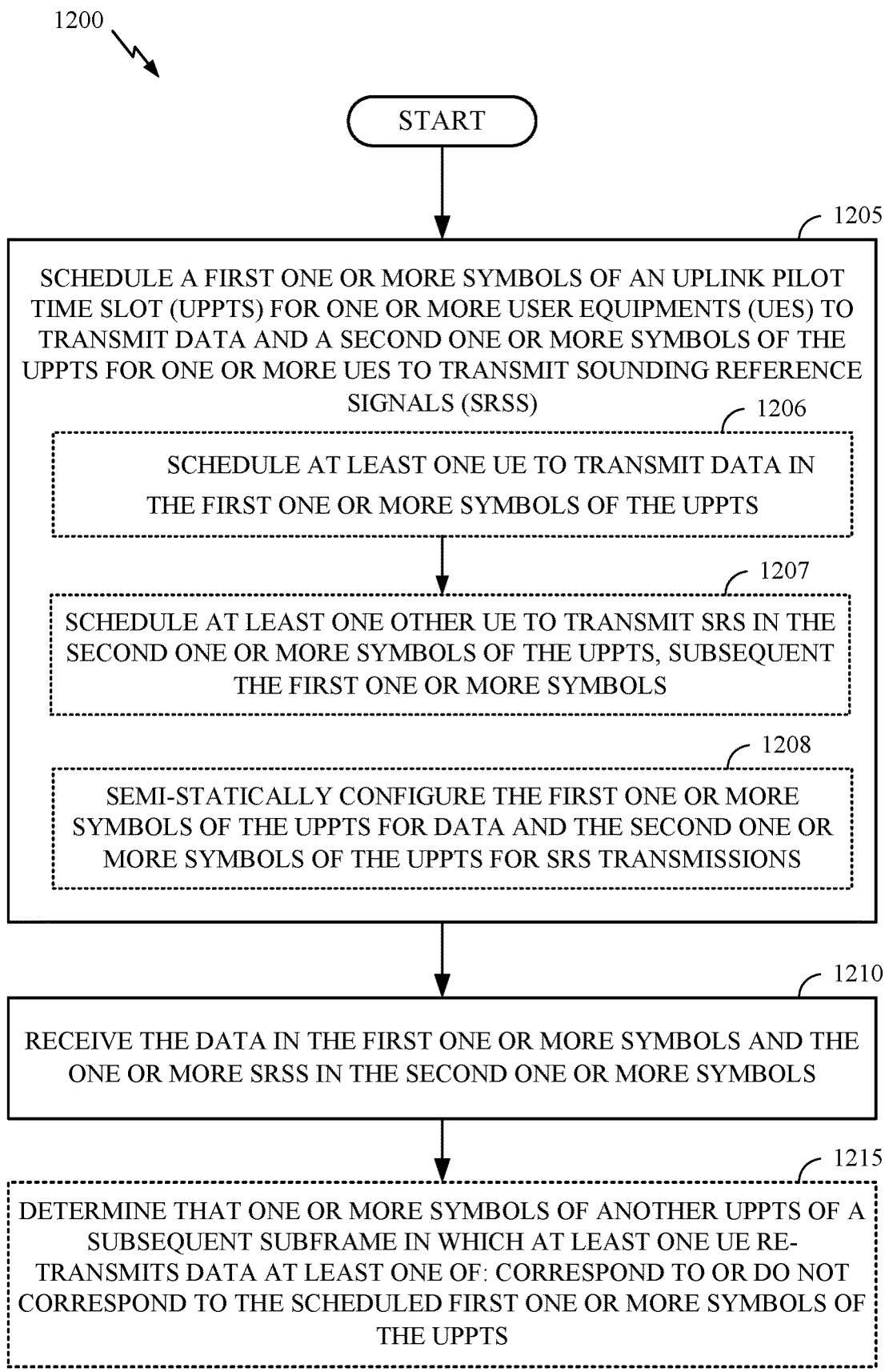
FIG. 12 is a flowchart illustrating example operations for wireless communications by a BS, in accordance with certain aspects of the present disclosure.

FIG. 12 is flowchart illustrating example operations 1200 for wireless communications, in accordance with certain aspects of the present disclosure. The operations 1200 may be performed, for example, by a BS (e.g., BS 110).

Operations 1200 may begin, at 1205, by scheduling a first one or more symbols of a UpPTS for one or more UEs to transmit data and a second one or more symbols of the UpPTS for one or more UEs to transmit SRSs. The BS can flexibly schedule which symbols of the UpPTS are assigned to which UEs and/or what type of signal is transmitted by a UE on those symbols. For example, the scheduling may change from UpPTS to UpPTS. Further, the scheduling can be flexible based on a tradeoff between more UpPTS symbols for data to increase throughout or more UpPTS symbols for SRS for better channel estimation and/or channel estimation for more UEs.

According to certain aspects, optionally, the scheduling at 1205 includes, at 1206, scheduling UEs to transmit data (e.g., PUSCH) in a first number of symbols of the UpPTS (e.g., at the beginning of the UpPTS) and, at 1207, scheduling a second number of symbols (e.g., the remaining symbols) of the UpPTS, subsequent the first number of symbols, for SRS transmissions by the same or other UEs. The BS may schedule different UEs to transmit SRSs in different symbols of the UpPTS. The BS may schedule UEs to transmit data in different symbols for different UpPTSs in a frame.

According to certain aspects, the BS flexibly schedules the UE(s) semi-statically. For example, optionally, the scheduling at 1205 includes at 1208, semi-statically configuring the first one or more symbols of the UpPTS for data and the second one or more symbols of the UpPTS for SRS transmissions (e.g., via radio resource control (RRC) signaling). Alternatively, the scheduling may be dynamic. The BS may provide an uplink grant in downlink control information (DCI) indicating a number and/or location of the one or more symbols of the UpPTS for transmission of the data or SRS. The operations 1200 may include compressing other information in the DCI. A different format of the DCI may be used than a DCI format used for a grant for a non-UpPTS symbol.

At 1210, the BS receives the data in the first one or more symbols and the SRSs in the second one or more symbols. For example, the BS receives the data and SRS according to the scheduling. The BS may receive data and SRS in the UpPTS from a single UE or from multiple UEs. The BS may receive data and SRS in different symbols for different UpPTS in a frame or in different frames. The BS may process the data and/or perform channel estimation using the SRS.

In aspects, the operations 1200 include, at 1215, determining that at least some symbols of another UpPTS in a later (e.g., subsequent) subframe in which a UE re-transmits data (e.g., a HARQ retransmission) correspond to or do not correspond to the scheduled first one or more symbols of the UpPTS (in which the UE transmits the data). In aspects, the operations 1200 include determining the one or more symbols for data and SRS transmission in the UpPTS based on a number of UEs to be scheduled to transmit SRS.

According to certain aspects, the one or more symbols scheduled for the one or more UEs to transmit data in the UpPTS are associated with a mapping to locations in the UpPTS for transmission of one or more demodulation reference signals (DMRS).

The BS may schedule the one or more UEs to transmit DMRS in at least one symbol scheduled for SRS transmission or associated with one or more SRSs. For example, the BS may determine one or more frequency resources in at least one symbol scheduled for SRS transmission or associated with one or more SRSs that are unused and schedule DMRS transmission in the unused frequency resources. In aspects, the operations 1200 include indicating a frequency division multiplexing (FDM) structure or power level for the scheduled DMRS transmission. The BS may schedule the SRS transmission around the frequency resources scheduled for DMRS transmission in the symbol.

Figure 12A:
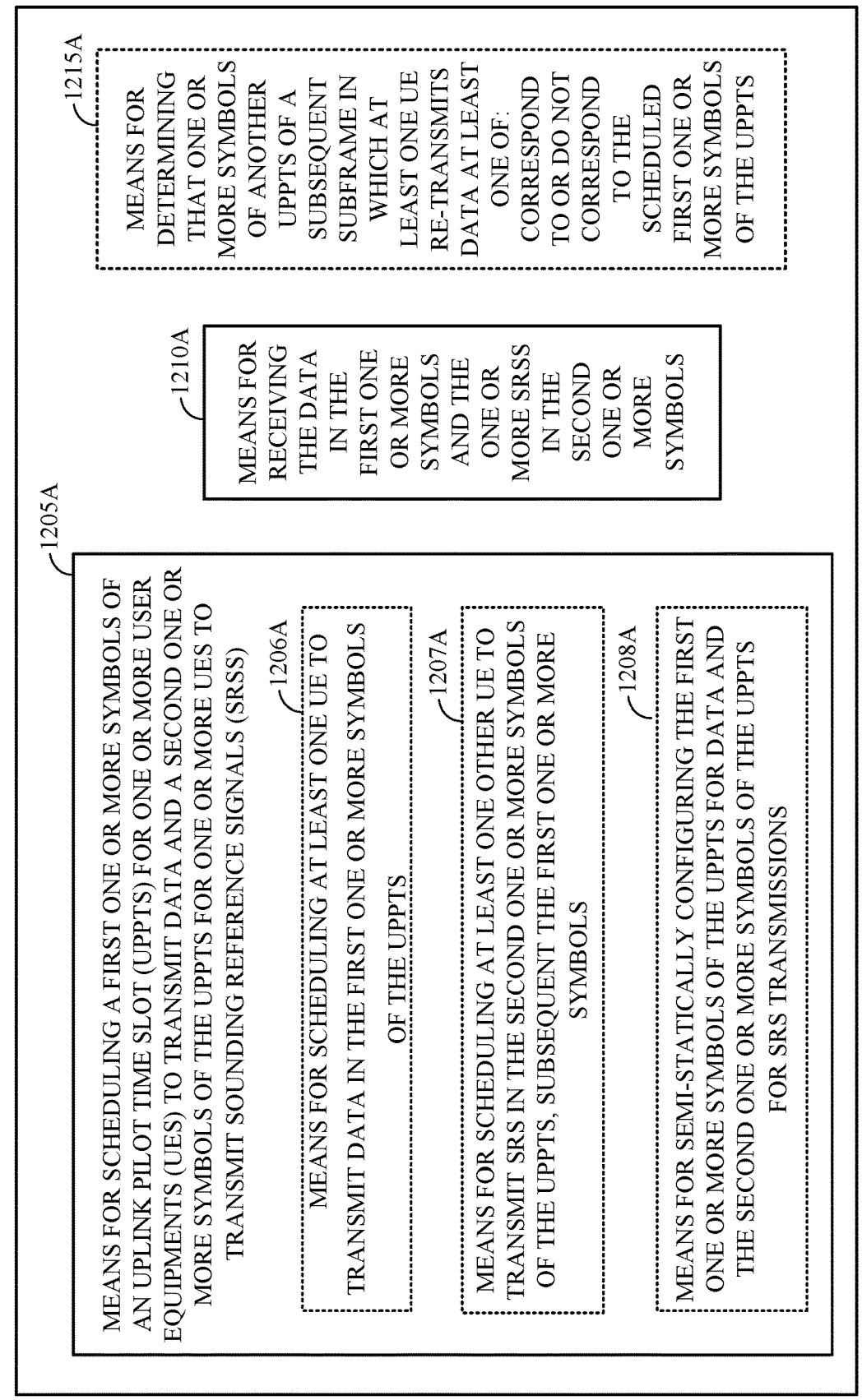
FIG. 12A shows a communication device illustrating means for performing the operations for wireless communications illustrated in FIG. 12, according to certain aspects of the present disclosure.

FIG. 12A illustrates a communications device 1200A (e.g., such as a BS 110) that may include various means-plus-function components configured to perform the operations 1200 illustrated in FIG. 12. For example, at 1205A, the communications device 1200A includes means for performing the operations illustrated at 1205 in FIG. 11. Optionally, the means-plus-function component 1205A includes at 1206A, 1207A, and 1208A, means for performing the operations illustrated at 1206, 1207, and 1208, respectively, in FIG. 12. Additionally, at 1210A, the communications device 1200A includes means for performing the operations illustrated at 1210 in FIG. 12. Further, optionally, at 1215A, the communications device 1200A includes means for performing the operations illustrated at 1215 in FIG. 12.

Figure 13:
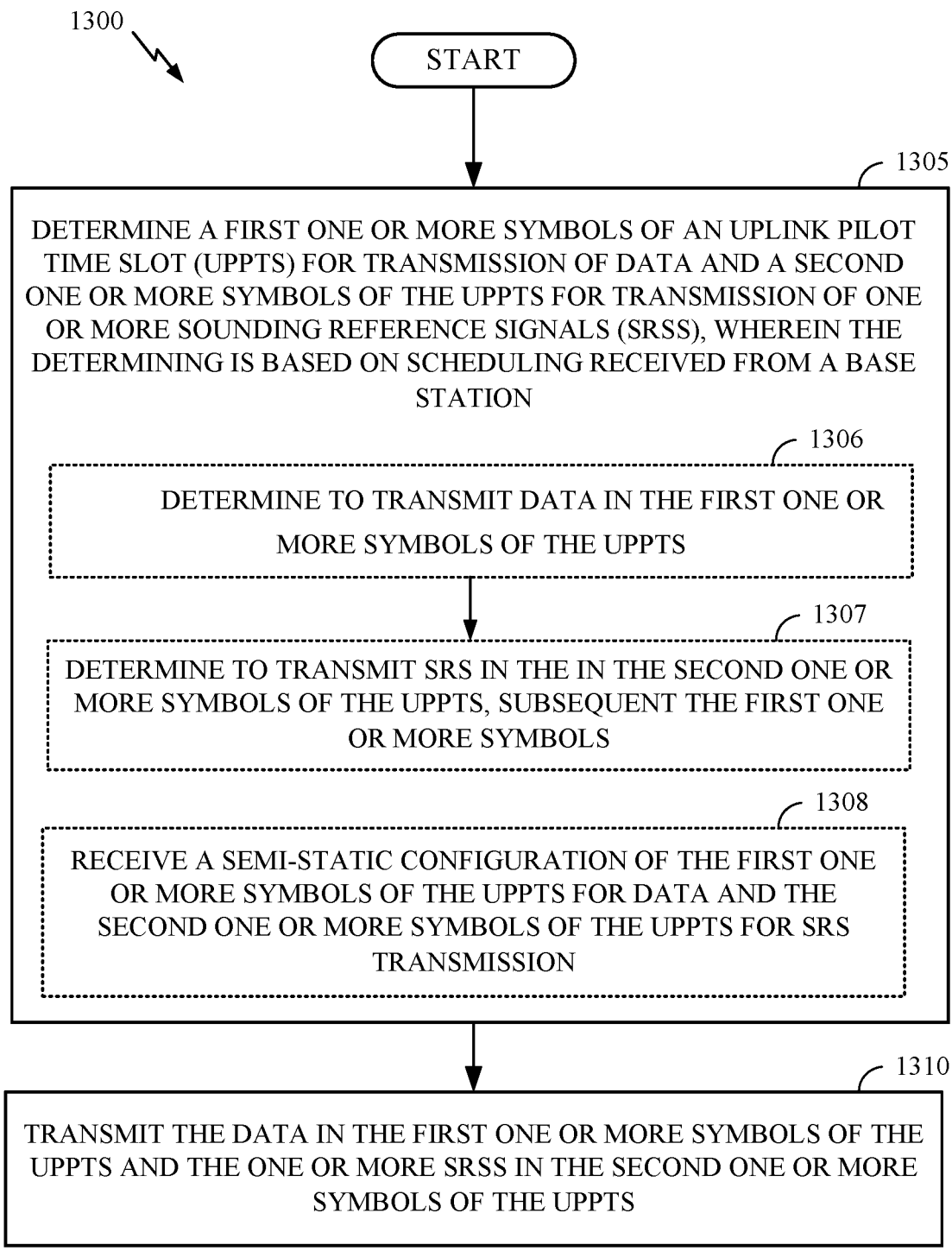
FIG. 13 is a flowchart illustrating example operations for wireless communications by a UE, in accordance with certain aspects of the present disclosure.

FIG. 13 is flowchart illustrating example operations 1300 for wireless communications, in accordance with certain aspects of the present disclosure. The operations 1300 may be performed, for example, by a UE (e.g., UE 120). Operations 1300 may be complementary operations by the UE to the operations 1200 performed by the BS.

Operations 1300 may begin at 1305 by determining a first one or more symbols of a UpPTS for transmission of data and a second one or more symbols of the UpPTS for transmission of one or more SRS. The determining is based on scheduling received from the BS.

According to certain aspects, optionally, the determination at 1305 includes, at 1306, determining to transmit data in the first one or more symbols of the UpPTS (e.g., at the beginning of the UpPTS) and, at 1307, determining to transmit SRS in the second one or more symbols (e.g., the remaining symbols) of the UpPTS. The second one or more symbols may be subsequent to the first one or more symbols.

According to certain aspects, the UE is semi-statically scheduled. For example, optionally, the determination at 1305 includes at 1308, receiving a semi-static configuration of the first one or more symbols of the UpPTS for data and the second one or more symbols of the UpPTS for SRS transmissions (e.g., via radio resource control (RRC) signaling).

At 1310, the UE transmits the data in the first one or more symbols of the UpPTS and the one or more SRSs in the second one or more symbols of the UpPTS. For example, the UE transmits the data and SRS according to the determination at 1305, which is based on the scheduling from the BS. The UE may be scheduled to transmit data and/or SRS in different symbols for different UpPTS in the frame.

Figure 13A:
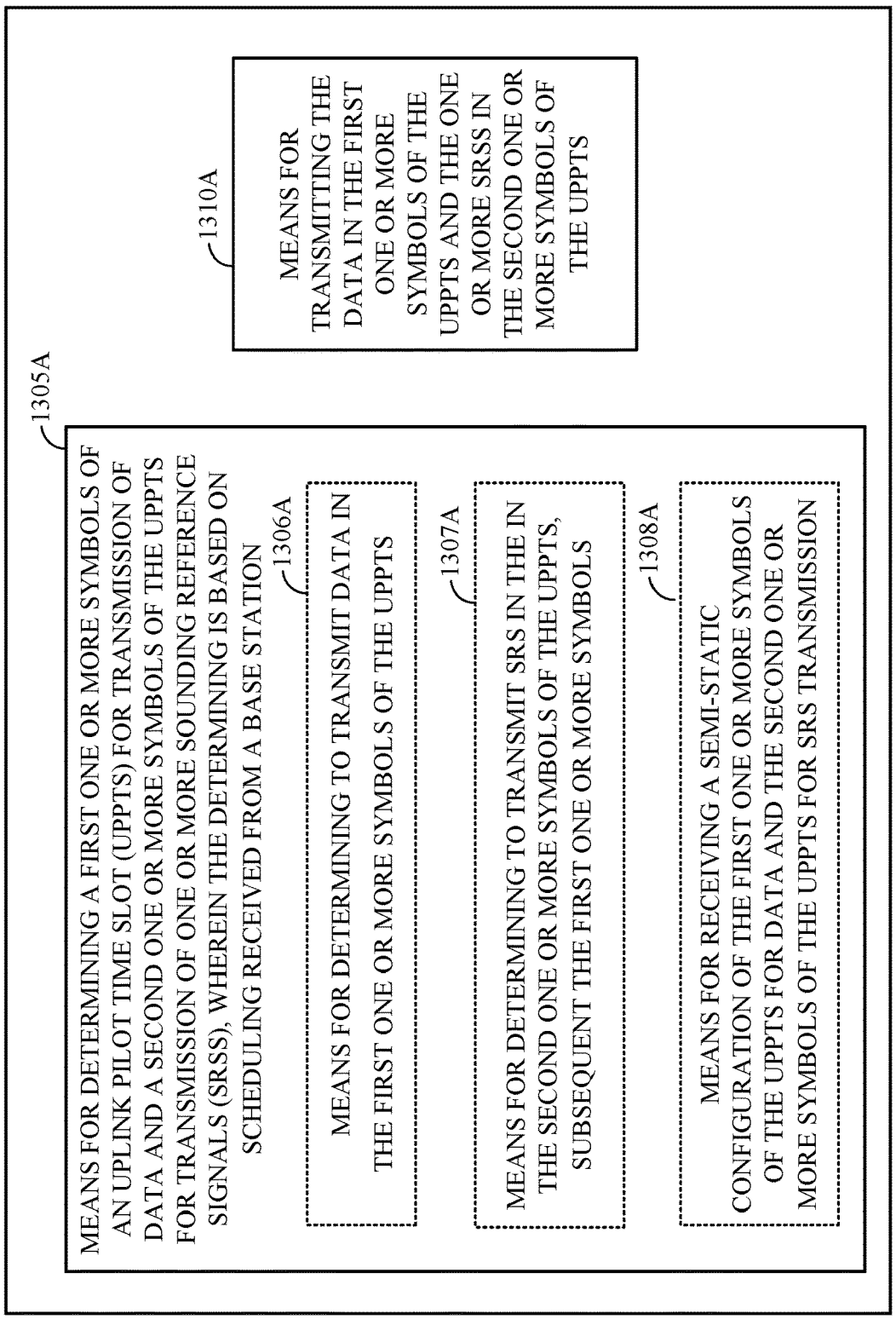
FIG. 13A shows a communication device illustrating means for performing the operations for wireless communications illustrated in FIG. 13, according to certain aspects of the present disclosure.

FIG. 13A illustrates a communications device 1300A (e.g., such as a UE 120) that may include various means-plus-function components configured to perform the operations 1300 illustrated in FIG. 13. For example, at 1305A, the communications device 1300A includes means for performing the operations illustrated at 1305 in FIG. 13. Optionally, the means-plus-function component 1305A includes at 1306A, 1307A, and 1308A, means for performing the operations illustrated at 1306, 1307, and 1308, respectively, in FIG. 13. Additionally, at 1310A, the communications device 1300A includes means for performing the operations illustrated at 1310 in FIG. 13.

Example PUSCH and SRS Resource Split in UpPTS

According to certain aspects, the BS can schedule some of the 6 symbols of the UpPTS for data and some of the symbols for SRS transmission. In aspects, multiple UEs can be scheduled to transmit SRS in the UpPTS. In aspects, the UE scheduled to transmit data in the UpPTS can also be scheduled to transmit SRS in the UpPTS. The BS can schedule different UpPTS (e.g., within a radio frame) differently. For example, different UpPTS can be scheduled with different splits of symbols for data and SRS and/or transmissions by different UEs.

In an example implementation, the BS may flexibly schedule data for the beginning of the UpPTS, followed by SRS. For example, the BS may schedule the first three symbols of the UpPTS for data (e.g., transmitted by a UE) and the last three symbols of the UpPTS for SRS transmission (e.g., by one or more different UEs and/or by the same UE). Scheduling data at the beginning of the UpPTS followed by SRS may lead to simpler processing and signaling, since data is continuous in the time domain. This approach may be backward compatible since some legacy UE may transmit SRS only at the end of the UpPTS. In some cases, the BS may be restricted on which symbols it can schedule for data and/or SRS transmission (e.g., to the beginning or ending symbols).

In another example implementation, the BS may flexibly schedule data in any of the six symbols of the UpPTS. For example, the BS can schedule the UE to transmit data in a set of symbols (e.g., contiguous or non-contiguous symbols) in the UpPTS and the BS schedules the remaining symbols in the UpPTS for SRS transmission. Alternatively, the BS schedules the UE(s) to transmit SRS in a set of symbols in the UpPTS (contiguous or non-contiguous symbols) and then schedules the remaining symbols in the UpPTS for data transmission.

According to certain aspects, the BS determines how many symbols in the UpPTS, and/or which symbols in the UpPTS, to schedule for data and how many and/or which symbols in the UpPTS to schedule for SRS transmission. The BS also determines which UE(s) to schedule in the symbols.

Example Configuration of PUSCH/SRS Resource Split in UpPTS

According to certain aspects, the BS may schedule the transmissions in the UpPTS semi-statically and/or dynamically. Semi-static signaling may be infrequent higher layer (e.g., via RRC) signaling. For example, the BS may semi-statically schedule transmissions in the UpPTS that may be followed for several subframes or frames, or even indefinitely until a different configuration is signaled.

According to certain aspects, the BS schedules the UE(s) based on the number of users (e.g., UEs) that are scheduled to transmit SRS. Since the BS schedules SRS, the BS knows how many users are scheduled and can semi-statically (e.g., via RRC) configure the UpPTS symbols for data and SRS transmission based on a tradeoff of number of users transmitting SRS and uplink data throughput. For example, for less UEs scheduled to transmit SRS, the BS may schedule more symbols in the UpPTS for data to increase throughput; while for the case of more UEs scheduled to transmit SRS, the BS may schedule more symbols in the UpPTS for SRS transmission.

Alternatively, the BS can dynamically schedule transmissions in the UpPTS. For example, for each subframe with a UpPTS the BS can configure the PUSCH transmissions in the UpPTS. The schedule can be based on current SRS usage information (e.g., which OFDM symbols are already scheduled to be used for SRS transmission). The BS can dynamically schedule the UpPTS by sending an uplink grant for the data (e.g., including the information on how many symbols and/or which symbols are used for PUSCH) in DCI scheduling the data for that subframe.

A few extra bits in DCI may be used for supporting the uplink grant for PUSCH in the UpPTS. According to certain aspects, other information in DCI may be compressed to save bits for the uplink grant for the UpPTS (e.g., to keep DCI length the same). For example, resource block (RB) bundling may be used to reduce the resource allocation (RA) field length. This may be useful for certain uplink downlink configurations (e.g., LTE UL/DL configuration #0) that do not have new uplink grant transmission locations. Alternatively, a new DCI format may be defined which may be longer to include additional bits for the uplink grant for the UpPTS. For example, the new DCI may useful for LTE UL/DL configurations 1-5 where the uplink grant for data in UpPTS is transmitted in new downlink subframes. In this case, the uplink grant for the UpPTS may not be confused with other uplink grants. According to certain aspects, the different DCI format (e.g., DCI with compressed information or the new longer DCI) can be used for different uplink grant transmission opportunities.

For synchronous hybrid automatic repeat request (HARQ), a grant is not needed for retransmission, instead a bit in the PHICH can be used to indicate whether a retransmission should be sent (e.g., ACK or NACK). If the UE(s) are semi-statically configured with the PUSCH symbols in the UpPTS, the UE(s) know which symbols are for data. Thus, the UE(s) can perform synchronous HARQ transmissions in the UpPTS.

When using synchronous HARQ and UE(s) are dynamically configured with PUSCH symbols in UpPTS, the BS can be restricted to schedule a retransmission using a same resource allocation pattern as the original transmission, and the UE scheduled can assume the same PUSCH symbol usage for retransmission when triggered by PHICH. When asynchronous HARQ is used, in which an uplink grant is used to trigger retransmission, the PUSCH symbol usage in UpPTS can be included in the uplink grant.

According to certain aspects, the BS can use a bitmap to indicate the symbols for data and/or SRS transmission to the UE(s).

Example DMRS in UpPTS

According to certain aspects, scheduling for DMRS transmission can be signaled, semi-statically configured, or implicitly indicated. For example, the DMRS location may be implied by the symbols scheduled for the data (e.g., PUSCH) in the UpPTS. Different combinations of symbol usage for data may be mapped to a fixed (e.g., configurable) DMRS location pattern. In aspects, to allow more resources (e.g., resource elements (REs)) for data transmission, DMRS may be transmitted in the SRS region (e.g., including symbols scheduled for SRS transmission) in the UpPTS. For example, the DMRS may be frequency division multiplexed (FDMed) with the SRS in some symbols in the UpPTS. A comb structure may be used for the DMRS transmission.

According to certain aspects, the BS can semi-statically or dynamically configure the UE to transmit the DMRS in the UpPTS. For example, the BS may use RRC signaling to semi-statically configure a comb structure to be used by the UE for the DMRS. Alternatively, the BS can signal the symbol and comb structure in DCI. In aspects, the DMRS within the data OFDM symbols may be used as a default.

According to certain aspects, the BS can schedule the DMRS for the data and the SRS in the UpPTS using an SRS-first approach. For example, the BS can first schedule/determine the SRS locations in the UpPTS. The BS may identify empty frequency resources in the symbols scheduled for SRS, and can schedule/determine DMRS in the empty frequency resources. The BS may signal the location, comb structure, and/or power level to be used in the uplink grant in DCI.

Alternatively, the BS can schedule the DMRS for the data and the SRS in the UpPTS using a data first approach. For example, the BS can schedule/determine the data and DMRS transmissions in the UpPTS and can then schedule/determine SRS (e.g., aperiodic SRS) around the DMRS resources. According to certain aspects, aperiodic SRS trigger bits may be used to control the SRS transmission (e.g., the port, comb structure, power level, etc.).

Aspects described herein for flexible scheduling of SRS, data, and/or DMRS in symbols of the UpPTS may allow for the UpPTS to be advantageously used data transmission and SRS transmissions. For example, the BS can schedule more or less UEs to transmit SRS for estimation as tradeoff with scheduling more or less data in the UpPTS to increase throughput.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
   scheduling a first one or more symbols starting from a beginning symbol of an uplink pilot time slot (UpPTS) for a user equipment (UE) to transmit data; and
   receiving the data from the UE in the first one or more symbols.

2. The method of claim 1, further comprising:
   scheduling at least one UE to transmit sounding reference signals (SRS) in a second one or more symbols of the UpPTS, subsequent the first one or more symbols.

3. The method of claim 2, further comprising:
   determining the first one or more symbols of the UpPTS for data and the second one or more symbols of UpPTS for SRS based on a number of UEs to be scheduled to transmit SRS.

4. The method of claim 2, wherein the scheduling comprises scheduling multiple UEs to transmit SRSs in different symbols of the second one or more symbols of the UpPTS.

5. The method of claim 1, further comprising:
   semi-statically configuring a number of the first one or more symbols of the UpPTS for data.

6. The method of claim 1, wherein the data is transmitted in a physical uplink shared channel (PUSCH).

7. The method of claim 1, wherein the UpPTS comprises six symbols.

8. The method of claim 1, wherein the scheduling comprises scheduling the at least one other UE to transmit data in a second one or more symbols of another UpPTS in a same frame as the UpPTS.

9. The method of claim 1, further comprising:
   determining that one or more symbols of another UpPTS of a subsequent subframe in which the UE re-transmits data at least one of: correspond to or do not correspond to the scheduled first one or more symbols of the UpPTS.

10. A method for wireless communications by a user equipment (UE), comprising:
    determining to transmit data in a first one or more symbols starting from a beginning of an uplink pilot time slot (UpPTS), wherein the determining is based on scheduling received from a base station; and
    transmitting the data in the first one or more symbols of the UpPTS.

11. The method of claim 10, further comprising:
    determining to transmit sounding reference signals (SRS) in a second one or more symbols of the UpPTS, subsequent the first number of symbols.

12. The method of claim 10, further comprising receiving a semi-static configuration of a number of the first one or more symbols of the UpPTS for data.

13. The method of claim 10, wherein the data is transmitted in a physical uplink shared channel (PUSCH).

14. The method of claim 10, wherein the UpPTS comprises six symbols.

15. An apparatus for wireless communications, comprising:
    means for scheduling a first one or more symbols starting from a beginning symbol of an uplink pilot time slot (UpPTS) for a user equipment (UE) to transmit data; and
    means for receiving the data from the UE in the first one or more symbols.

16. The apparatus of claim 15, further comprising:
    means for scheduling at least one UE to transmit sounding reference signals (SRS) in a second one or more symbols of the UpPTS, subsequent the first one or more symbols.

17. The apparatus of claim 16, further comprising:
    means for determining the first one or more symbols of the UpPTS for data and the second one or more symbols of UpPTS for SRS based on a number of UEs to be scheduled to transmit SRS.

18. The apparatus of claim 16, wherein the means for scheduling comprises means for scheduling multiple UEs to transmit SRSs in different symbols of the second one or more symbols of the UpPTS.

19. The apparatus of claim 15, further comprising:
    means for semi-statically configuring a number of the first one or more symbols of the UpPTS for data.

20. The apparatus of claim 15, wherein the UpPTS comprises six symbols.

21. The apparatus of claim 15, wherein the means for scheduling comprises means for scheduling the at least one other UE to transmit data in a second one or more symbols of another UpPTS in a same frame as the UpPTS.

22. The apparatus of claim 15, further comprising:
    means for determining that one or more symbols of another UpPTS of a subsequent subframe in which the UE re-transmits data at least one of: correspond to or do not correspond to the scheduled first one or more symbols of the UpPTS.

23. An apparatus for wireless communications, comprising:
    means for determining a first one or more symbols starting from a beginning of an uplink pilot time slot (UpPTS) for transmission of data, wherein the determining is based on scheduling received from a base station; and
    means for transmitting the data in the first one or more symbols of the UpPTS.

24. The apparatus of claim 23, further comprising: means for determining to transmit sounding reference signals (SRS) in a second one or more symbols of the UpPTS, subsequent the first number of symbols.

25. The apparatus of claim 23, further comprising means for receiving a semi-static configuration of a number of the first one or more symbols of the UpPTS for data.

26. The apparatus of claim 23, wherein the UpPTS comprises six symbols.

\* \* \* \* \*